Figure 1:
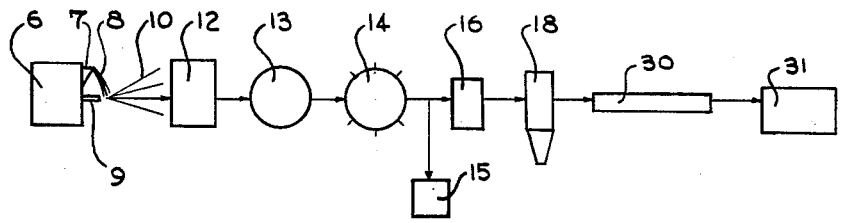

March 22, 1955     R. C. MEADERS     2,704,603

METHOD OF REFINING INORGANIC FIBROUS MATERIALS

Filed Feb. 13, 1952

INVENTOR.
ROBERT C. MEADERS
BY
ATTORNEY

United States Patent Office 2,704,603
Patented Mar. 22, 1955

2,704,603

METHOD OF REFINING INORGANIC FIBROUS MATERIALS

Robert C. Meaders, Niagara Falls, N. Y., assignor to The Carborundum Company, Niagara Falls, N. Y., a corporation of Delaware Application February 13, 1952, Serial No. 271,405

2 Claims. (Cl. 209—211)

This invention relates to methods and apparatus for refining inorganic fibrous material.

Inorganic fibrous materials, other than those found in nature such as asbestos, are commonly named according to their origin as slag wool, mineral wool, refractory wool or glass wool. These various inorganic fibrous products of industry are usually made by fusing in one way or another a mixture of inorganic oxides and subjecting a stream of the molten material to a high velocity blast of air or steam or otherwise mechanically dissipating the molten material to form a mass of fibrous material which as blown or otherwise fabricated contains a large proportion of pellets or otherwise extraneous or non-fibrous matter. The amount of non-fibrous material including pellets is usually quite large, sometimes amounting to as high as 60–70% or more of pellets and otherwise non-fibrous extraneous matter, despite considerable effort to reduce the extent of the formation of pellets and other non-fibrous material in the product by careful control over the fiberizing operation. This is particularly true in the case of oxidic compositions which are of a highly refractory nature and therefore are more difficult to convert to fibrous form. These industrial inorganic fibrous materials are used primarily as thermal and/or sound insulating bodies or as filtering media and the presence of such non-fibrous matter detracts from their usefulness so that it is highly desirable to remove as much of the non-fibrous material as possible from the fiber product before its use in various fabricated forms for those purposes. It has therefore been standard practice in the formation of inorganic fibrous materials by air or steam blowing or by other mechanical fiberizing operations by which the molten material is disintegrated to fibrous form to subsequently subject the mass of fibrous material to various air-separating treatments to remove the pellets and other non-fibrous matter. For example, the fibers are sometimes formed by blowing into a long collection chamber of sufficient length that the fibers are held in suspension for a prolonged period of time and over a substantial distance so that some of the pellets and coarse material drop out along the way. The fibrous mass of material as blown and containing pellets and other undesirable contaminants sometimes has been subjected to various types of beating or agitation, or its direction of flow changed as it is carried along by the original fiberizing blast with or without supplementary air currents, in order to further promote the removal of non-fibrous matter. These various separating measures individually or collectively have not been satisfactory in removing the finer non-fibrous material from the product. There has therefore been a need for a method and apparatus for more effectively removing the pellets and other non-fibrous material from the various synthetic inorganic fibrous products in order to further enhance their properties as a filtering or insulating material.

It is an object of the present invention to provide a method and apparatus for more efficiently refining the inorganic fibrous products of the hereinabove described type.

It is a further object to provide a method and apparatus for obtaining a refined inorganic oxidic material from which a greater amount of the extraneous non-fibrous matter has been removed.

It is a still further object to provide a method and apparatus for further refining an air-refined inorganic fibrous material whereby the material can be refined not only with greater effectiveness but with rapidity.

Figure 2:
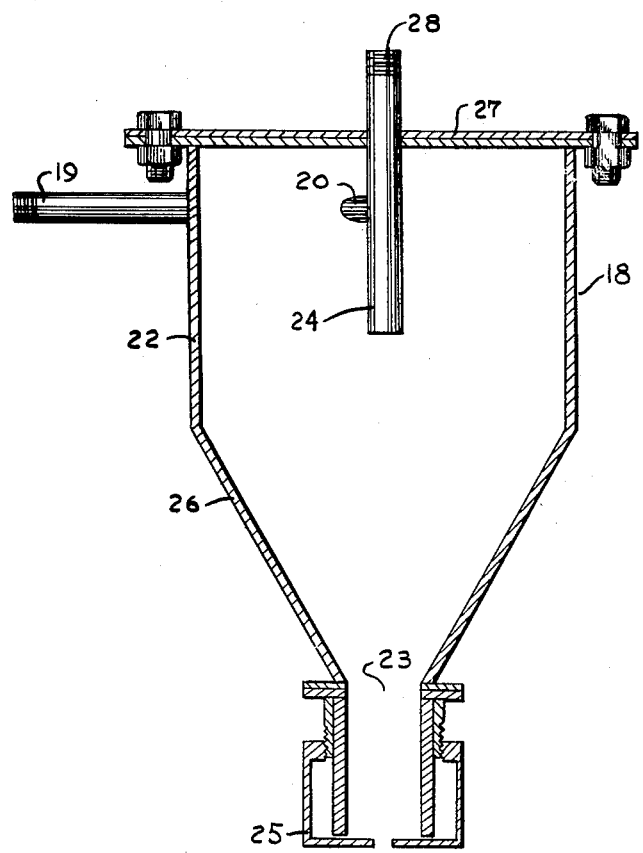

With these and other objects in view, my invention consists in certain novel features of construction and operation hereinafter more fully described and claimed, and illustrated in the accompanying drawings, in which Figure 1 is a flow sheet showing schematically the various steps in refining inorganic fibrous materials in accordance with the present invention; and Figure 2 is a vertical diametric section of an apparatus for carrying out the wet separation of non-fibrous material.

In accordance with the present invention I have found that most effective separation of the non-fibrous extraneous matter from the mass of fibers as blown or otherwise obtained is secured by first subjecting the fibrous mass to a dry or air separation treatment by which the coarser non-fibrous matter is extracted, after which the crudely refined fibrous material is further subjected to a wet separation treatment designed to remove much of the finer extraneous non-fibrous matter remaining and unremoved by the air separation treatment. For example, I have found that in the formation of a mineral or refractory wool composed mostly of alumina and silica in which the fibers are formed by air or steam blowing of the molten oxidic mixture, the resulting fibrous product as blown contains as much as 60–70% pellets or other non-fibrous material. After such material has been subjected to an air cleaning treatment it is found to still contain in the neighborhood of 25–30% of finer pellets and non-fibrous matter. The amount of pellets and other non-fibrous matter can be further reduced to less than 10% by weight of the product by subjecting the dry cleaned material to a wet separating treatment in accordance with the teachings of the present invention, as more fully described below.

The air cleaned material is placed in liquid suspension in a large body of water and agitated sufficiently to separate the fibers and maintain them in full suspension, although the agitation is not of sufficient violence to break down the individual fibers to any substantial degree. The suspended fibrous material is then subjected to a centrifugal action such as by projecting a stream of the material at high velocity tangentially into a cylindrical chamber. The greater part of the non-fibrous material contained in the suspension is thrown down in the chamber and collected at the bottom where it is withdrawn, allowing the main body of water in which the fibrous material remains suspended to be discharged from a discharge port located in the upper portion of the chamber. This chamber in which the wet separation takes place is referred to as a liquid-solid cyclone because of the character of action which takes place therein.

Referring further to the flow sheet shown in Figure 1, a molten mass of inorganic oxidic material is fed from furnace 6 over or through furnace spout 7 in the form of a stream 8 of molten material which is struck by a blast of air or steam from air or steam nozzle 9 to convert the molten stream of material into a mass of fibrous material 10. While I have shown a furnace and air blast as the mechanism for forming the mass of fibrous material the material may be provided in fused form in a cupola or other furnacing means and other means of disintegrating the molten material to fibrous form may be employed, such as discharging a stream of the molten material onto one or more high speed rotating discs or spinning surfaces from which it is thrown by centrifugal force to fiberize the molten body, without departing from the scope of the present invention. The mass 10 of fibrous material as blown or otherwise fiberized contains a large amount of non-fibrous extraneous matter such as pellets and the like, often amounting to as much as 60–70% by weight of the entire mass.

The air suspended body 10 of fibers and accompanying extraneous matter is carried by the force of the fiberizing air blast into a collecting hood or chamber 12 which is of sufficient length and suitable cross-sectional area to maintain the material in suspension for a sufficient period of time that the coarser material falls to the bottom of the chamber where it collects and is periodically withdrawn. The remaining fibrous suspension of fibrous material is collected on a rotating drum 13 or conveyor belt located at the far end of the collection chamber 12. The body of fibrous material is then conveyed to a beater 14 which is of the type commonly used in the processing of cotton fibers where the fibers are opened up and the pellets which are sometimes attached as beads to the ends of some of the fibers are broken off and segregated from the fibers. The fibers pass from the beater 14 to a collecting condenser 15 which collects the air cleaned fibrous material in the form of a continuous matt or series of individual batts. The fibrous product at this stage in the process contains usually in the neighborhood of 25–30% of pelleted or otherwise non-fibrous material most of which is extremely fine and so adherent to the fibers as to be extremely difficult to remove. Much of the industrial inorganic fibrous material is sold in this form. However, it is often the practice where it is desirable to still further reduce the amount of non-fibrous matter contained in the fibers to repeat the same air cleaning procedures with possibly the addition of certain refinements in processing and such repetition is carried on until the removal of non-fibrous matter such as pellets from the fibers has been carried out to the point where there is no longer any substantial removal of further material.

In accordance with the present invention, I have found that when this air or dry cleaned fibrous product containing in the neighborhood of 25–30% pellets and other non-fibrous matter is suspended in a large body of water and the liquid suspension of material subjected to agitation such as the type obtained in a paper beater the fibers and the remaining non-fibrous matter are placed in a condition such that they can be much more effectively separated when subjected to suitable wet treatment. In other words, by placing the fibers as they come from the final air cleaning treatment in aqueous suspension in tank 16 which is equipped with agitator paddles and agitating, the fibers become separated in such a way that the suspension is ready to give up the non-fibrous matter when suitably acted upon. The aqueous suspension of fibers and extraneous non-fibrous matter after being thusly conditioned by agitation to separate the fibers is fed from the beater at high velocity into a second chamber 18.

Reference is made to Figure 2 showing the chamber 18 in greater detail. The suspension of fibrous material is introduced into chamber 18 tangentially at high velocity by means of inlet line 19 and port 20. The tangential injection of the aqueous suspension of fibrous material as it enters chamber 18 at high velocity supports the vortex action of the suspension of fibers and other matter and the centrifugal forces of this vortex throw the particles of non-fibrous material to the side walls 22 of the chamber where they collect and pass downward and are either periodically removed by removal of cap 25 or are continually withdrawn through proper conduit means. The fine fibers contained in most of the water which entered the separating chamber 18 move to the inner spiral of the vortex and flow out through the vortex finder 24.

The chamber 18 is usually cylindrical at the top with a conical shaped lower portion 26 leading to the discharge or withdrawal port 23 used for removal of the non-fibrous matter extracted from the aqueous suspension. The main body of water containing the desired fibrous material is continually withdrawn or discharged by means of pipe or vortex finder 24 extending through the top cover 27 of the chamber 18 to a point below the tangential inlet opening 20 through which the suspension is fed at high velocity to the chamber 18. While the specific apparatus shown depicts the discharge opening 28 as being in the top of the chamber it is possible to place the discharge at the side although it is essential that the discharge vent be positioned below the level of the inlet opening 20. Cyclone chamber 18 may range in size from 3" or less to 17" or more in diameter at the cylindrical portion of the chamber depending upon the volume of material to be handled. The conical walls 26 of the chamber are usually pitched at an angle of 10° to 20° from the vertical. Tons of material per day can be handled by a cyclone chamber of the described type no longer than 3–12" in diameter so that the capacity of such a chamber is much larger than might be considered possible.

Referring back to the flow sheet shown in Figure 1 the aqueous suspension of fibers after removal from the cyclone chamber 18, at which point the suspension of fibrous material usually contains less than 10% of non-fibrous material, most of which is in such a finely divided or dust-like form that it does not interfere to any marked extent with the insulating or filtering properties of the final product, is further processed to extract the bulk of the water of the suspension by passing the material to filtering equipment such as that shown diagrammatically in Figure 1 and indicated generally by reference numeral 30 where the fibers are felted in batt form and the bulk of the water extracted after which the batt is passed to drying equipment 31. Any of the conventional procedures for making paper is followed in producing the final product in the form of an inorganic fiber sheet material or paper.

Having described the invention in detail, it is desired to claim:

1. A method of refining inorganic fibrous material comprising first subjecting the inorganic fibrous material as fiberized and containing large amounts of extraneous non-fibrous matter to a preliminary air separation to remove substantially all the coarser extraneous material from the fibers, suspending the air-refined fibrous material in an aqueous medium, subjecting said aqueous suspension of fibrous material to centrifugal force to throw out non-fibrous matter from the suspension of fibrous material, and draining water from the resulting refined fibrous material.

2. A method of refining inorganic fibrous material comprising selecting an inorganic fibrous material that has been subjected to a preliminary air separation to remove substantially all the coarser extraneous material from the fibers, suspending the air-refined fibrous material in an aqueous medium, subjecting said aqueous suspension of fibrous material to centrifugal force to throw out non-fibrous matter from the suspension of fibrous material, and draining water from the resulting refined fibrous material.

References Cited in the file of this patent

UNITED STATES PATENTS

| Number | Name | Date |
|---|---|---|
| 1,988,371 | Chance | Jan. 15, 1935 |
| 2,255,227 | Parsons | Sept. 9, 1941 |
| 2,377,524 | Samson | June 5, 1945 |
| 2,450,901 | Lyall | Oct. 12, 1948 |

OTHER REFERENCES

Chemical Abstracts, vol. 43, page 3544. Abstracts of article: "A New Method of Obtaining Mineral Wool" by Z. I. Perkal and A. S. Epstein, in Prom. Stroitel. Material, 2 No. 8, 79–82 (1940).